May 25, 1937.  H. STOLPER  2,081,608

EYEGLASSES

Filed May 22, 1935

INVENTOR.
Harry Stolper
BY
ATTORNEY.

Patented May 25, 1937

2,081,608

UNITED STATES PATENT OFFICE 2,081,608

EYEGLASSES

Harry Stolper, New York, N. Y.

Application May 22, 1935, Serial No. 22,678

2 Claims. (Cl. 88—47)

This invention relates to improvements in eyeglasses, being particularly directed to lens fastenings therefor.

Up to the present time, lenses have been fastened either to the nose bridge or to the temple bars, either by framing a portion of a lens and passing a screw or other fastening means through an aperture in the lens at the frame portion, or providing cavities at opposite sides of the lens and applying a plurality of framing elements, one on each side of the lens, the said elements being connected by a screw or fastening means at a point distant from the lens. In the first case, there is constantly present the danger of lens breakage due to the passing of a fastening means through an aperture in the lens, while in the second instance there is present the tendency of the respective interconnected framing members, which are rigid in formation, to be laterally displaced or, when tightened, being non-resilient, to cause pressure sufficient to precipitate a crack where the projections of the framing members rest in cavities of the lens.

It is an object of this invention to provide a unitary frame or clamp having bifurcated resilient sections, each of which has projections thereon, resting in cavities of the lens, the resilient arms of the clamp being interconnected through fastening means distant from the lens, which act on the flexible arms to form a positive yet resilient clamping grip for the lens.

These and other advantages, capabilities and features of the invention will appear from the subjoined detailed description of one specific embodiment thereof illustrated in the accompanying drawing, in which Figure 1 is a front elevation of eyeglasses, incorporating the clamp.

Figure 1:
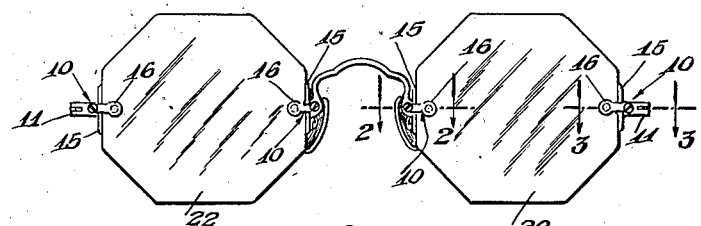
Figure 2:
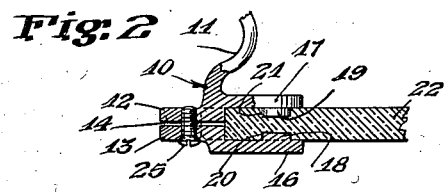
Figure 2 is a plan view in section taken along lines a—a of Figure 1.
Figure 3:
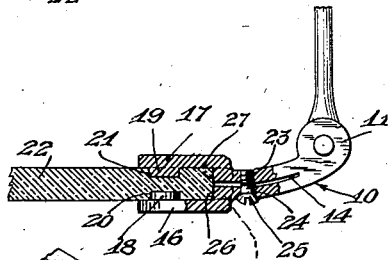
Figure 3 is a plan view in section taken along lines b—b of Figure 1.
Figure 4:
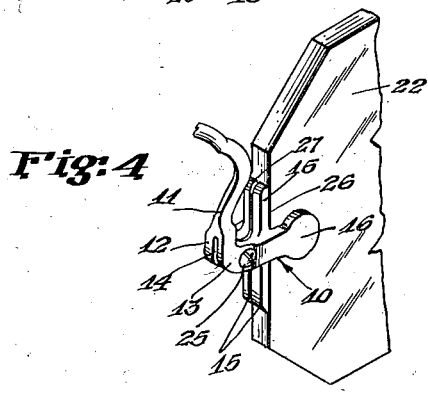
Figure 4 is a perspective view of the clamp as applied to the bridge of eyeglasses.
Figure 5:
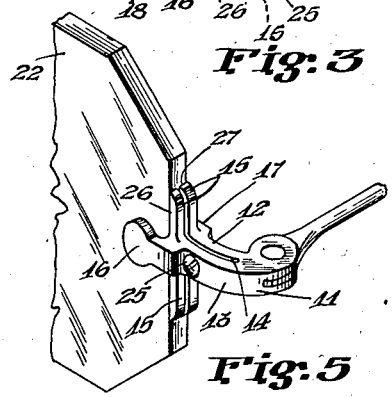
Figure 5 is a perspective view of the clamp as applied to the temple of eyeglasses.

Referring to the reference characters in the drawing, numeral 10 represents a clamp as applied to the bridge or temple bar assembly, the same being shown in detail in Figures 2 and 4 with respect to the bridge and 3 and 5 with respect to the temple bar. The clamp 10 comprises a bifurcated element having a connecting portion 11 and arms 12 and 13. The clamp is formed of resilient metal as by stamping or a casting which has been tempered and slit.

Referring to Figures 2 to 5 inclusive, the arms 12 and 13 are separated by a slit 14 at the intermediate section thereof, at the end of which intermediate section are disposed upstanding braces or fingers 15, which are adapted to rest against the edge or rim of the lens. From the intermediate portion of the clamp and integral with and offset from the brace 15 there is provided lens gripping members 16 and 17 which have formed thereon projections 18 and 19, which are adapted to rest in grooves or cavities 20 and 21 formed in the lens 22. A threaded aperture 23 is formed in the arm 12 and a clearance hole 24 in the arm 13 concentric with threaded hole 23 in arm 12, at the intermediate portion of the clamp and in these apertures is adapted to be disposed fastening means 25 in the form of a screw.

In assembly the lens gripping members 16 and 17 are disposed over the lens so that the projections 18 and 19 thereof rest in the cavities 20 and 21 at which position the faces 26 and 27 of the braces 15 rest against the edge of the rim of the glasses, the gripping members being sprung into position on the lens. To firmly yet resiliently position the clamp with respect lens, screw 25 is passed through apertures 23 and 24 of the arms 12 and 13, causing the same to be drawn towards one another to the required tension sufficient to maintain the lens properly within the gripping members. The bridge and temple bar clamps are then attached respectively to the bridge proper and the temple bar either through integral formation as the clamp of the bridge or separable connection as the clamp and temple bar.

Figure 6:
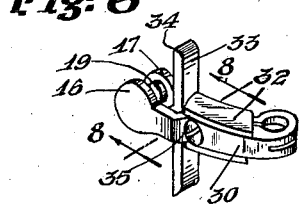
Figure 6 is a perspective view of a modified form of clamp.
Figure 8:
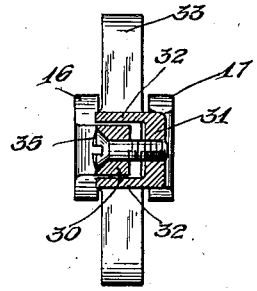
Figure 8 is a plan view in section taken along lines c—c of Figure 6.
Figure 7:
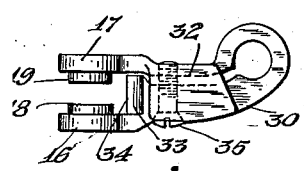
Figure 7 is a plan view of the modification shown in Figure 6.

In the modification shown in Figures 6 to 8 inclusive, the bifurcated clamp is provided with a single brace and the respective arms are adapted to interfit. As shown in this construction, one of the arms 30, with which the unitary brace 31 is integral, is adapted to rest within the channel formation at the intermediate portion of arm 32, said channel formation involving a plurality of walls 33 which extend over and close the opposite ends of arm 30. In assembly the gripping member 16 and 17 carrying the projections 18 and 19 are placed over the lens 22 causing face 34 of the brace 31 to rest against the rim or edge of the lens, the arm 30 being substantially enclosed for its intermediate length within the arm 32. Fastening means in the form of a screw 35 passes through the apertures 36 and 37 of the arms 30 and 32, thereby causing the gripping members 16 and 17 to be firmly yet resiliently mounted with respect to the lens, the arms 30 and 32 being interconnected in resilient relationship with respect to one another as the fastening means is tightened.

It is obvious that various changes and modifications may be made to the details of construction without departing from the general spirit of the invention as set forth in the appended claims:

I claim:

1. A clamp for eyeglasses, comprising a bifurcated member, the arms thereof forming the furcations being resilient, lens bracing members formed intermediate of each arm and lens gripping members formed adjacent the extremity of each arm for respectively clasping the edge and faces of a lens, and fastening means passing through the arms adjacent the bracing members and remote from the lens for drawing the gripping members towards one another to clasp the lens.

2. A clamp for eyeglasses, comprising a bifurcated member, the arms forming the furcations being resilient, cooperating lens bracing and lens gripping members formed respectively intermediate of and at the extremities of each of said arms and fastening means passing through said arms intermediate of their length and remote from the lens, whereby to cause the lens bracing and gripping members to be displaced towards one another for mounting said lens.

HARRY STOLPER.